United States Patent

[11] 3,553,495

[72] Inventor William J. Shaugnessy
Basking Ridge, N.J.
[21] Appl. No. 630,888
[22] Filed Apr. 14, 1967
[45] Patented Jan. 5, 1971
[73] Assignee American Standard Inc.
New York, N.Y.
a corporation of Delaware

[54] FAIL-SAFE DRIVER CIRCUIT
10 Claims, 4 Drawing Figs.

[52] U.S. Cl. .......... 307/284, 307/247, 307/252, 307/274, 331/107, 331/111
[51] Int. Cl. .......... H03k 3/26
[50] Field of Search .......... 307/247, 252, 274, 284; 331/107, 111

[56] References Cited
UNITED STATES PATENTS

| | | | |
|---|---|---|---|
| 3,383,623 | 5/1968 | Vercollatti et al. ........... | 307/252X |
| 3,438,023 | 4/1969 | Apitz ........... | 307/284X |

*Primary Examiner*—Donald D. Forrer
*Assistant Examiner*—J. D. Frew
*Attorneys*—Jefferson Ehrlich and Tennes I. Erstad

ABSTRACT: This invention employs a circuit serving as a high reliability driver for controlling a solid state bidirectional switch of, for example, the thyristor type. The driver circuit converts a low-energy DC control signal into a sufficiently large pulse repeated at a rapid rate so as to maintain the thyristor switch in continuous conduction when connected in series with an AC power source and a load.

PATENTED JAN 5 1971

3,553,495

SHEET 1 OF 2

INVENTOR.
William J. Shaughnessy
BY Jefferson Ehrlich
ATTORNEY

SUS Characteristics

INVENTOR.
William J. Shaughnessy
BY Jefferson Ehrlich
ATTORNEY

FAIL-SAFE DRIVER CIRCUIT

BACKGROUND OF THE INVENTION

This invention relates to circuits for controlling the operation of a solid state switch so that it may function as a control means for interconnecting a source of power with a load circuit. The switch device, which may be, for example, a bidirectional device, is so arranged and controlled as to disassociated the power source from the load under abnormal conditions or when a signal device, which is used to start or stop the operation, does not emit an appropriate signal. But when conditions are normal and the signal device emits and appropriate signal, a pulse is generated at a sufficiently high-frequency rate and at a sufficiently high voltage, and the power source will be caused to supply power to maintain the load continuously operated.

In broad outline, this invention provides apparatus for controlling the interconnection of a source of power to a load such as, for example, machinery or other large or sensitive equipment. The control apparatus provides fundamental fail-safe features not only for the protection of the load itself, but also for personnel and equipment which may be affected by a mishap in the operation of the load.

This invention, in its bare essentials, employs a bidirectional solid-state, hereinafter called a "switch," , which interconnects, in tandem, a power source to a load, a driver circuit, and a low-energy signal source, all so arranged that when the signal source emits a signal of a sufficient level to the driver circuit, the switch will be rendered conductive and enable the power source to supply full power to the load. But when such signal is absent, notwithstanding a component failure in the driver circuit, the switch will be subsequently instantly rendered nonconductive and will disassociate the power source from the load.

One of the principal components employed in the practice of this invention is the switch device which may be, for example, a bidirectional or bilateral solid-state thyristor device which normally provides a high impedance between the power source and the load. The switch device will normally conduct current from an AC source when properly initiated, but the conduction of current will cease immediately upon the reversal of the AC current. The switch device, therefore, only conducts during, for example, the positive half of the cycle of the AC source—a period of operation which is too brief to be significant. In order to continue the conductivity of the switch device, it is necessary to provide still other initiating and repetitive pulses to cause the device to operate on the negative portion of the AC cycle, then again at the subsequent positive portion, etc. In the absence of such repetitive stimulants, the switch device acts merely as a high impedance or open circuit. The invention involves the appropriate signal means for maintaining the switch device continuously conductive to provide a low or negligible impedance path between the power source and the load. When a failure occurs in the control apparatus, then, in accordance with this invention, the switch device will become nonconductive within the time interval of a half cycle of the AC power source.

Another of the principal components employed in the practice of this invention is a solid-state diode device, which will be referred to hereinafter by the designation "SUS," employed for triggering the above-noted bilateral switch device at a very rapid rate, for example, 10 kHz., if the power source supplies a 60 Hz. current. By employing such a relatively high repetition rate for stimulating the switch device, the switch device will be substantially continuously maintained in a conductive state. That is, the switch device will not be "turned off" when powered by a 60 Hz. source for more than about 100 microseconds during each half cycle of the AC power current.

There is no moving part in any of the equipment of this invention. The signal source, when initiated, effectuates fail-safe operation of the load and, when stopped or interrupted, effectuates fail-safe stoppage of the operation of the load.

This invention will be better understood from the more detailed description hereinafter following, when read in connection with the accompanying drawing in which.

Figure 1:
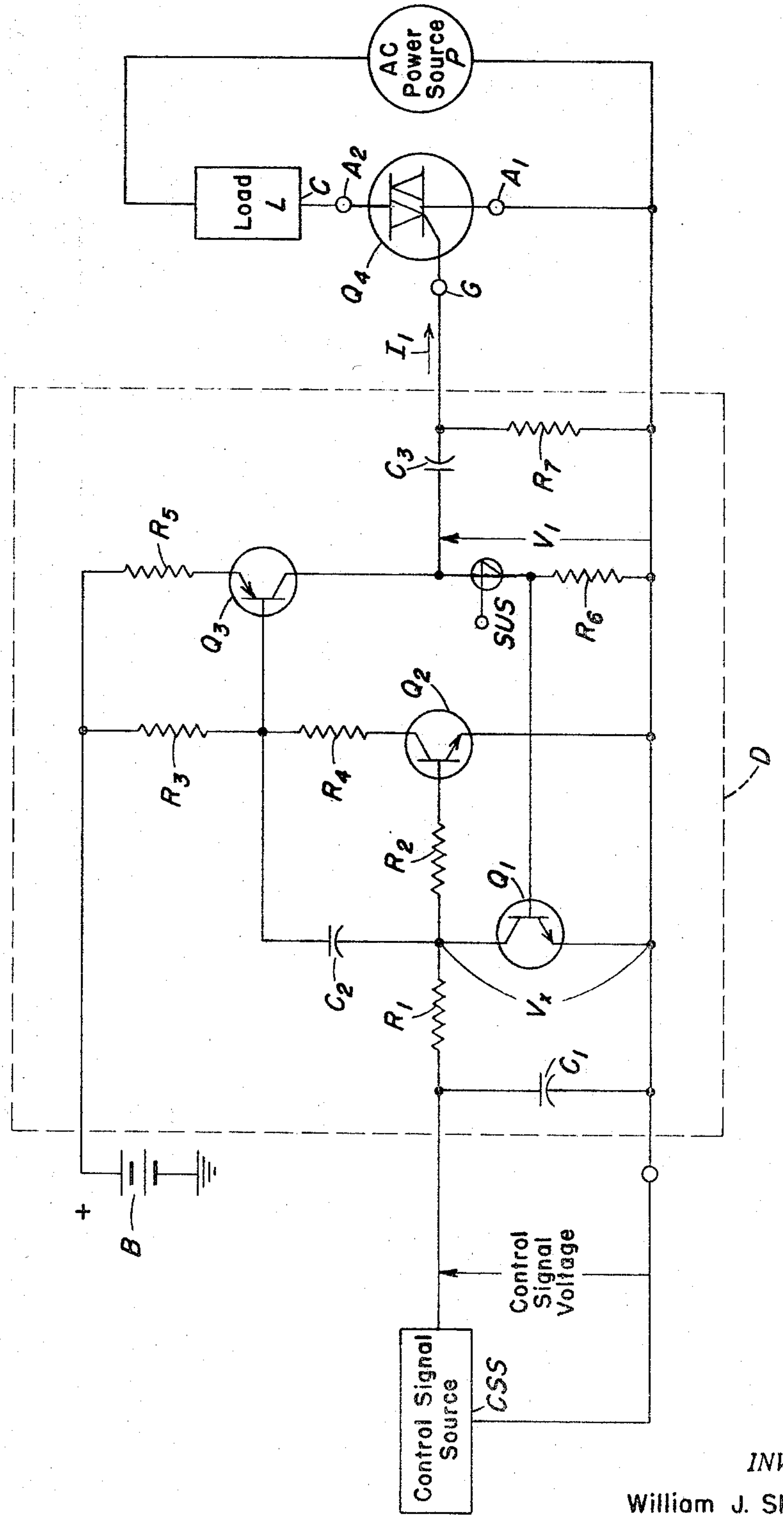
FIG. 1 shows schematically one arrangement for practicing the invention.

Referring more particularly to FIG. 1, there is shown a control signal source designated CSS and a load L which is to be operated continuously as long as the control signal source CSS supplies sufficient signal voltage and remains effectively connected to the load L through a driver circuit D shown in dotted lines THe load L is connected to a source of AC power P through a bilateral solid-state diode or static switch $Q_4$ which may also be called a "thyristor switch." The load L may be any electrical appliance or network. or other apparatus which may be operated by, for example, conventional 60 Hz. power via the thyristor switch $Q_4$.

The control signal source CSS and the series circuit which consists of load L, the AC power source P and switch $Q_4$, are connected together by the driver circuit D which may include, as shown, three transistors $Q_1$, $Q_2$ and $Q_3$, a silicon unilateral switch designated SUS, three capacitors $C_1$, $C_2$ and $C_3$, and seven resistors $R_1$, $R_2$, $R_3$, $R_4$, $R_5$, $R_6$ and $R_7$. The signal source CSS includes internal switching mechanism (not shown) for operatively associating the signal source CSS to the driver circuit D. A source of DC voltage B may be connected to the driver circuit D as shown.

When insufficient energy (or zero energy) is supplied by driver D to the gate terminal G, then the thyristor switch $Q_4$ will serve as a virtual open circuit and no current will flow from source P to the load L. On the other hand, when sufficient energy is supplied by driver D to the gate terminal G, the thyristor switch $Q_4$ changes state and serves as a low impedance, thereby allowing current to flow freely from source P to the load L. Once the thyristor device $Q_4$ enters its conducting state, it will remain conductive regardless of the amount of energy, however small or large, is applied to the gate terminal G by driver D. However, the thyristor device $Q_4$ will remain conductive until the current flowing therethrough from source P falls off to a very small or negligible value, whereupon the load L will be interrupted in its operation.

If the thyristor switch $Q_4$ is to remain in a conductive state as long as a sufficient voltage is applied by source P, then, according to this invention, a sufficient voltage must be applied to the gate terminal G once during the positive portion of the cycle of the current supplied by source P and once again during the negative portion of the cycle of such current.

Thus, according to this invention, the driver D is designed to supply sufficient energy through the gate terminal G to the thyristor switch $Q_4$ to maintain the static switch $Q_4$ substantially continuously conductive. This will keep the load L continuously activated by power source P. Hence the driver D must supply a pulse to the gate terminal G at least twice during each cycle of the alternating current of source P, or once during each half cycle of such alternating current. Furthermore, the timing of these pulses must follow closely the reversals in the alternating current of source P.

Stated differently, once the device $Q_4$ is rendered conductive, it will permit the load L to be energized by the AC source P. The energization of load L will be interrupted just as soon as the AC voltage of source P reached its nodal or zero value unless a pulse of sufficient (predetermined) magnitude were applied to the gate terminal G. However, if the gate terminal G were supplied with two pulses during each cycle of the current of power source P so that the two pulses were synchronized with the reversals of the cycles of the power source P, the load L would be operated uninterruptedly. Hence, for a 60 Hz. power source, a gate pulse repetition rate of 120 Hz., or any source supplying a higher repetition rate than 120 Hz., would be sufficient to maintain the load L in continuous operation. Because the gate pulse rate preferably may not be synchronized with, and may not be intended to be synchronized with, the current reversals of power source P, then a much higher gate pulse repetition rate, such as 10 kHz. or any much higher frequency, may be employed effectively to maintain continuity in the operation of the load L. If a 10 kHz. gate pulse rate is developed, the thyristor switch $Q_4$ will never be "turned off" for more than 100 microseconds during each half cycle period of 8⅓ milliseconds, as already explained. But not withstanding the minute interruptions of the thyristor switch $Q_4$, the load L will remain continuously operated and in service.

The mechanism which furnishes the gate pulses at a sufficiently high rate is provided by the driver circuit D which will now be described. The driver circuit supplies the pulse energy to operate the thyristor switch $Q_4$ in response to a low but ample energy level control signal emitted by the control signal source CSS. the driver circuit D is arranged and designed to be fail-safe when the thyristor switch $Q_4$ is in its nonconducting state. The failure of any component of the driver circuit to function properly will not cause the operation of the load L. During such cases of failure, the thyristor switch $Q_4$ will not be driven into its conducting state when the source CSS calls for the switch $Q_4$ to be nonconducting. Such a feature of protection and security is highly valuable where life and property may depend on the safe operation of the load.

When the voltage supplied from source CSS is zero or below a predetermined value, the transistor $Q_1$ will be nonconducting as will be explained. The flow of current from source B through resistors $R_3$ and $R_4$ to and through collector-emitter junction of transistor $Q_2$ to ground is a mere trickle. Therefore, the voltage drop across resistor $R_3$ is insufficient to forward bias the base-emitter junction of transistor $Q_3$. Consequently, only a small leakage or trickle current will flow from source B through the circuit of resistor $R_5$, the emitter and collector junction of transistor $Q_3$, the silicon device SUS and resistor $R_6$ to ground. this small leakage current will switch the device SUS into its low voltage conducting state. furthermore, the voltage generated across resistor $R_6$ will be insufficient to forward bias the base-emitter junction of transistor $Q_1$, and this transistor will remain nonconductive.

When the voltage derived from the control signal source CSS is at its normal operating value, that is, a DC voltage which exceeds a predetermined value, that voltage will be applied through resistor $R_1$ to the collector and emitter electrodes of transistor $Q_1$. At the same time, the source CSS will transmit that same voltage through resistors $R_1$ and $R_2$ to the base electrode of transistor $Q_2$ to drive transistor $Q_2$ into its active state, that is, into near saturation. When this happens, the flow of current from source B through resistors $R_3$ and $R_4$ will substantially increase. The increased voltage generated across resistor $R_3$ will forward bias the base-emitter junction of transistor $Q_3$ and hence the flow of current through the emitter and collector of transistor $Q_3$ via resistor $R_5$ will increase by several orders of magnitude. Resistor $R_5$ serves principally to limit the maximum collector current of transistor $Q_3$.

Figures 3, 4:
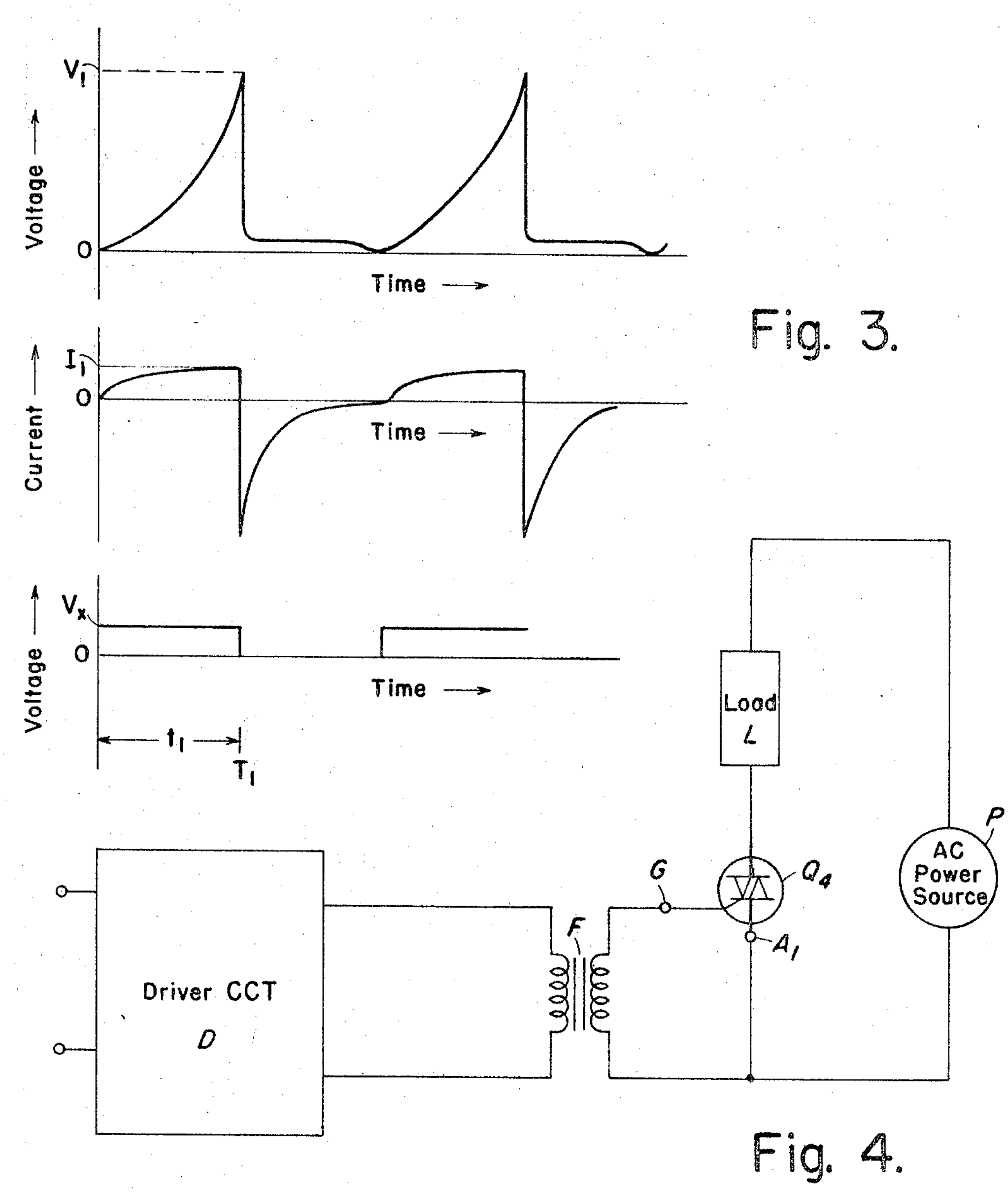
FIG. 3 shows a series of curves usable to explain certain of the features of the invention and of another of the devices that may be employed in the invention.
FIG. 4 illustrates schematically a modification of the arrangement of FIG. 1.

Responding to the increased current through the collector circuit of transistor $Q_3$, the capacitor $C_3$ will become charged by current from source B over a circuit which includes the resistor $R_5$, the emitter and collector of transistor $Q_3$, capacitor $C_3$, the gate terminal G of the thyristor switch $Q_4$, the anode terminal $A_1$ of said switch $Q_4$ and ground. The magnitude of the charging voltage will initially be insufficient to cause the thyristor switch $Q_4$ to enter its conducting state. But the charging voltage reaching capacitor $C_3$ will increase, as is well understood, until the value of the voltage reaches a peak value $V_1$. As shown in FIG. 3, the peak value of voltage $V_1$ is reached after the passage of time $T_1$. When the peak voltage is reached or approached, the switch SUS will then increase its conductivity rapidly, thereby causing an increased voltage drop across resistor $R_6$.

As soon as the voltage drop across resistor $R_6$ has reached a sufficiently high value, the base-emitter junction of transistor $Q_1$ will become forward biased and the device $Q_1$ will become conducting. The voltage drop $V_x$ across the collector and emitter of transistor $Q_1$ will then become decreased to a substantially zero value. This will initiate a negative pulse to be transmitted through the capacitor $C_2$ to the base electrode of transistor $Q_3$. The change in value of the voltage $V_x$ at time $T_1$ is shown in the lower curve of FIG. 3.

Thus, when the voltage to which capacitor $C_3$ is charged reaches a sufficient high value, for example, $V_1$, this voltage will cause the diode SUS to be fired, thereby breaking down its impedance to zero or a negligible value. The resulting voltage across resistor $R_6$ renders transistor $Q_1$ conducting and this in turn generates a short negative pulse to transistor $Q_3$. This will result in a sudden momentary increase in the collector current of transistor $Q_3$. The increased current will be sufficient to raise the voltage across the diode SUS, whereupon the latter device will enter its low voltage, high-conducting state. This state will occur at time $T_1$ as shown in FIG. 3.

When the diode SUS enters its low-voltage, high conducting state, the capacitor $C_3$ rapidly discharges over a circuit which includes the diode SUS and the base and emitter electrodes of the conducting transistor $Q_1$ and the $A_1$—G junction of the transistor switch $Q_4$. The peak current during the discharge of capacitor $C_3$ may be perhaps 200—400 ma., which is more than sufficient to cause the thyristor switch $Q_4$ to enter its conducting state. As the discharge current further decreases, transistor $Q_3$ becomes nonconductive and the current therethrough will reach a steady state level near zero. As soon as the discharge has reached a point where the current through the device SUS has reached the value $i_H$ (see FIG. 2), the device SUS has reached the will return to its low conduction state. This low current will be insufficient to maintain the base-emitter junction of transistor $Q_1$ forward biased, and hence transistor $Q_1$ will be cut off. When this happens, the transistor $Q_2$ will enter the near-saturation region. Now a positive pulse will be transmitted to the base of transistor $Q_3$ via capacitor $C_2$, and this will prevent transistor $Q_3$ from becoming activated or conducting for a time interval sufficient to allow the device SUS to latch into the nonconducting state.

As soon as the positive pulse produced by capacitor $C_2$ is dissipated, the transistor $Q_3$ will again become conducting as already stated and capacitor $C_3$ will start to recharge, etc., The cycle will repeat itself at a high frequency rate, for example, 7,000 to 10,000 or more times each second, if the signal obtained from source CSS is produced continuously. Thus, the time elapsed between current reversals through the thyristor switch $Q_4$—that is, the time interval between successive pulses supplied to gate G for retriggering the device $Q_4$—will not exceed about 100—140 microseconds when the constants are as already specified.

In one arrangement set up in accordance with this invention, the following components were employed:

$Q_1$—2N3858A (G.E.).
$Q_2$—2N3858A (G.E.).
$Q_3$—2N3905 (Motorola).
$Q_4$—Thyristor Q2015 (Electronic Control Corp.).
SUS—G.E.'s Unilateral Switch, designated SUS D13DI.
$R_1$—2.2k ohms.
$R_2$—2.2k ohms.
$R_3$—2.2k ohms.
$R_4$—10k ohms.
$R_5$—100 ohms.
$R_6$—100k ohms.
$R_7$—1.5k ohms.

The control signal source CSS was a control logic device made by Texas Instruments, Inc., No. 7400.

The control signal source CSS furnishes a signal of a few milliamperes and this small current causes the driver circuit D to furnish up to for example, about 400 ma. of current to the gate terminal G of the thyristor switch $Q_4$. Once the thyristor switch $Q_4$ enters the conducting state, it will remain in that state, as already explained, until the applied DC voltage from source CSS is reduced to a very small or zero value. However, the driver circuit D furnishes pulses of a sufficiently higher rate to maintain the switch $Q_4$ almost continuously operated, so that the load L will remain in uninterrupted service.

The driver circuit D serves to assure continuous fail-safe operation of the load L so long as the source CSS supplies a DC voltage exceeding a predetermined value, such as for example, 2.4 to 4.5 volts. The load L will be stopped as the signal voltage recedes from that value, or when the signal voltage source is disconnected.

In trials of the fail-safe features of this invention, a fault was simulated successively in each component of the driver circuit D while the signal from source CSS was below the value required to activate the driver circuit D. The operation of the thyristor switch $Q_4$ as well as the voltage at the gate G were then observed. In no case of any component failure, did the device $Q_4$ conduct current from the source P to the load L (except for the momentary segment of a half cycle of the AC current of source P).

Figure 2:
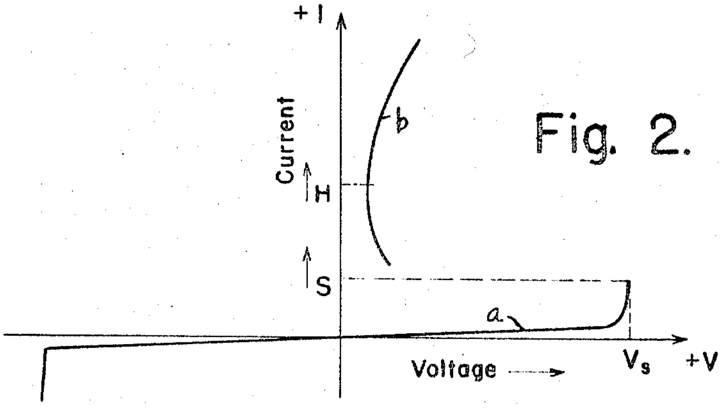
FIG. 2 shows characteristic curves of one of the devices that may be employed in practicing the invention.

FIG. 2 illustrates the characteristics of the diode SUS. As voltage across the diode device increases from an initial value of zero along curve *a*, very little current flows through the device (low conduction state). However, as the voltage approaches $V_s$, the current will increase rapidly. When the magnitude of the current reaches $T_s$, the device "switches" into the conducting state (curve *b*). It will remain in the conducting state until the current through the device is reduced to the level $i_H$, at which time the device will "switch" back to the nonconducting state (curve *a*).

FIG. 3 illustrates the characteristics of the pulses. The voltage $V_1$ will be applied across the series path of device SUS and resistor $R_6$. The current magnitude resulting from such a pulse is designated $T_1$. The voltage $V_x$, which is the voltage across the collector and emitter of transistor $Q_1$, is shown as a series of recurring DC pulses.

FIG. 4 is essentially the same as FIG. 1, except that in this arrangement a transformer F is inserted between the driver circuit D and the thyristor switch $Q_4$. The employment of the transformer will not appreciably alter the essential operation of the arrangement.

While this invention has been shown and described in certain particular embodiments and employing certain particular components merely for the purpose of illustration, it will be understood that the general principles of this invention may be embodied in other and wider varied organizations without departing from the spirit of the invention and the scope of the appended plans.

I claim:

1. In a power control system, the combination of a power circuit for supplying low frequency AC power to a load coupled to the power circuit; a bilateral unitary switch inserted in the power circuit and convertible from a high impedance to a low impedance to permit the flow of said low frequency AC power through said load, said bilateral switch returning to its high impedance when said AC power goes through each node of its successive half cycles; and a relaxation oscillator forming a generator for converting low voltage, small amplitude current into a train of high frequency large amplitude pulses for delivery to said bilateral switch to continuously apply to said bilateral switch pulses during each succeeding positive and negative half cycle of the AC power to cause said bilateral switch to exhibit substantially continuously a low impedance to the flow of current from said source of AC power to the load during said succeeding half cycles of said source, said relaxation oscillator including a breakdown device and a capacitor connected to said bilateral switch for charging said capacitor and discharging said capacitor through said breakdown device, said relaxation oscillator also including opposite conductivity transistors having their respective bases and collectors coupled to each other, wherein said breakdown device is coupled in the collector circuit of one of said transistors.

2. In a power control system, the combination defined by claim 1, including, in addition, a low energy DC source to initiate the operation of the generator.

3. In a power control system, the combination in accordance with claim 2, in which the high-frequency pulses of the generator are of relatively much higher energy than the energy of said DC initiating source.

4. In a power control system, the combination defined by claim 2, in which said generator includes a plurality of components and in which said power circuit will not be activated upon the failure of any component of said generator when the low energy source does not call for the initiation of the generator.

5. In a power control system, in accordance with claim 4, the combination including, in addition, means to prevent actuation of the power circuit upon failure of said generator when the low energy source does not call for the initiation of the generator.

6. In a fail-safe power control system, the combination of a DC signal source of voltage continuously supplying a relatively small amount of energy; a relaxation oscillator for converting the DC signal voltage into a train of pulses of current of relatively high amplitude and high frequency during the continuous supply of DC voltage from said signal source; a unitary bilateral switch to which the high-frequency pulses are applied; each high-frequency pulse causing the bilateral switch to be converted from a high impedance to a low impedance; a relatively low frequency power circuit which is independent of, but is controlled by, the DC signal source, said low-frequency power circuit including therein said bilateral switch to render the power circuit effective when a high-frequency pulse of current is applied to the bilateral switch and ineffective when said high-frequency pulse is suppressed; said bilateral switch being arranged to be deactivated upon the failure of said converting means when the signal source does not call for the actuation of the power circuit, said relaxation oscillator including a breakdown device and a capacitor connected to the bilateral switch for charging said capacitor according to the high amplitude current and discharging said capacitor through said breakdown device, said relaxation oscillator also including opposite conductivity transistors having their respective bases and collectors coupled to each other, wherein said breakdown device is coupled in the collector circuit of one of said transistors.

7. In a fail-safe power control system, the combination in accordance with claim 6, in which the converting means comprises a plurality of components, and in which the activation of the power circuit and the bilateral switch will not occur when any component of said converting means has failed and the signal source does not call for the actuation of the power circuit.

8. A fail-safe power control system comprising a power circuit for continuously supplying low frequency AC power to a load; a bilateral switch connected in series with said power circuit and serving as a control for said power circuit; said bilateral switch normally exhibiting a high impedance to block the flow of power to said load but exhibiting a low impedance when one or more high-frequency pulses of current are applied to said switch during each half cycle of said AC power; and a relaxation oscillator producing high-frequency pulses of current for transmission to said switch to operate it substantially continuously during successive and repetitive cycles of said AC power; said relaxation oscillator having a plurality of components which may fail; the bilateral switch continuing to exhibit a high impedance in response to the failure of any of the components of said generator; said relaxation oscillator including a breakdown device and a capacitor to be charged by the high-frequency pulses of current and to be discharged through said breakdown device, said relaxation oscillator also including opposite conductivity transistors having their respective bases and collectors coupled to each other, wherein said breakdown device is coupled in the collector circuit of one of said transistors.

9. A fail-safe power control system according to claim 8, including, in addition, a low voltage DC signal source connected to the relaxation oscillator for initiating the operation of said transistor network.

10. A fail-safe power control system according to claim 9, in which the relaxation oscillator provides pulses to the bilateral switch of an energy level high enough to produce the specified impedance changes therein, so that only a substantially small amount of energy is derived from the low voltage DC signal source.